United States Patent Office 3,123,452
Patented Mar. 3, 1964

3,123,452
GLASS POLISH AND PROCESS OF POLISHING GLASS
William M. Harris, Flemington, and Donald Mackie and William F. Meredith, Princeton, N.J., assignors to Titanium Zirconium Company, Inc.
No Drawing. Filed Jan. 19, 1959, Ser. No. 787,324
17 Claims. (Cl. 51—307)

This invention relates to a glass polish including zirconium oxide or cerium oxide or silicon dioxide or zirconium silicate, having combined therewith an additive comprising a hydroxide or carbonate of zirconium in an amount to enhance the polishing action of the oxide or silicate, and to a process of polishing therewith.

It is now well known that cerium and zirconium oxides are excellent polishing compounds for glass. These substances are finely ground and mixed with a small amount of a liquid, usually water, and the mix is then used to polish the rough glass surface. The polishing action of the material may be measured by the amount of glass removed in a stated period of time. Iron oxide is a fairly slow polishing agent by this standard, the commercial grade of zirconium oxide is intermediate, and cerium oxide usually gives the best performance of the three. Recently, however, a new form of zirconium oxide has been developed which is equal to cerium oxide in polishing power.

In accordance with the instant invention, it has been determined that the polishing action of zirconium oxide, silicon dioxide, zirconium silicate and cerium oxide can be considerably improved by incorporating therewith an additive comprising a small amount of a hydroxide, carbonate or other salt of zirconium. In fact, the polishing action can by this means be increased by as much as approximately 75%. These results are quite surprising, inasmuch as the hydroxides, carbonates or salts when used alone display virtually no polishing action. The fact that they can increase the polishing action of these compounds is therefore quite unexpected, and is indicative of an enhanced or synergistic effect.

The terms "cerium oxide" and "cerium hydroxide" are used herein to refer to ceric oxide and ceric hydroxide.

The enhanced polishing effect is specific so far as is now known to the chemically active hydroxides and carbonates of zirconium. Hydroxides or carbonates of these metals when dried except by solvent action or by air at ambient temperatures are less effective than as precipitated. The reason for this is not understood. The chemistry of these compounds is however quite complex. Zirconium carbonate probably does not exist as such, but is more accurately described by the term "carbonated hydrous zirconia." The carbon dioxide is loosely held in the hydrous zirconia in some way.

It is not essential to admix the hydroxide or carbonate as such with the polishing oxide. Salts of zirconium which will form the hydroxide or carbonate in situ in the polishing composition can be employed. In such cases, the benefits of the hydroxides or carbonates are realized as the hydroxide or carbonate is formed during the polishing.

As is well known, the pH of a zirconium oxide or cerium oxide polishing composition gradually increases, that is, the composition becomes more alkaline, as the polishing continues, because of the removal of alkaline material from the glass which dissolves into the polishing composition. Consequently, conversion of the less acidic or neutral zirconium and cerium salts to the corresponding hydroxides readily occurs in the composition in the course of polishing. Typical of such hydroxide-forming salts are the sulfates, nitrates, oxychlorides, and acetates of zirconium.

Alkali such as sodium or potassium hydroxide may be added to form the hydroxides before polishing is started. A carbonate of another metal may be added to form zirconium carbonate in situ by metathesis, or carbon dioxide may be bubbled into the polishing mix.

The amount of the polishing additive is not critical. As little as 0.25% will considerably improve the polishing ability of the cerium or zirconium oxide or silica or zirconium silicate. The upper limit of the amount is the point at which polishing efficiency of the oxide begins to be impaired, an effect probably due to the lack of polishing power of the additive when used alone. This limit usually is not reached until the composition contains more than 60% additive. Preferably, from 10% to 35% additive is employed. All weights are based on the weight of the polishing compound.

The glass polishing composition is readily prepared by mixing the polishing oxide or silicate with the zirconium polishing additive and with water to form a suspension which is then used in the conventional way in glass polishing apparatus.

The polishing is carried out in the conventional way at room temperature by applying the composition to the glass and then polishing with a felt or other type of polishing pad. The standard commercial bowl felt polisher is quite satisifactory. Water should be added from time to time to compensate for evaporation loss and maintain a constant concentration, but this is not essential.

The polishing characteristics of the composition are not exhausted in one polishing. On the contrary, and this is particularly true when the hydroxide or carbonate polishing additive is formed in situ, the polishing efficiency improves over the first three to ten 30 minute polishings, and then continues at a high level for many additional polishings. Thus, it is not only possible but actually more economical to reuse a polishing slurry for many sucessive polishing operations.

The crystal form of the zirconium oxide is not critical, and both monoclinic and cubic zirconium oxides can be used.

It is not necessary that the polishing additive be a salt, hydroxide or carbonate of the same metal as the polishing oxide or silicate. Thus, with cerium oxide there can be used zirconium hydroxide or carbonate and hydroxide- or carbonate-forming salts, for example. Mixtures of cerium and zirconium and silicon oxides and zirconium silicate with mixtures of zirconium polishing additives also are quite satisfactory, and have special properties which may warrant their use in preference to single oxides or silicates.

The following examples in the opinion of the inventors represent the best embodiments of their invention.

A standardized polishing test was used to evaluate polishing efficiency in the examples, carried out as follows: varying amounts of the polishing composition to be evaluated were thoroughly mixed in 150 ml. of water and a weighted glass disc was then polished for 30 minutes using a standard commercial bowl polisher. Water was added during the test to compensate for the evaporation loss and maintain a constant concentration. At the end of the test the glass disc was examined for quality of polish and weighed, the weight loss in mg. being the figure of merit in polishing efficiency. The test was repeated without changing the slurry for several test lenses.

*Example 1*

A mixture was prepared of 42.5 g. Lustrox brand zirconium oxide and 18.5 g. zirconium hydroxide. This material gave the following glass polishing test results: 299, 311, 294 mg. weight loss. 42.5 g. of the same oxide alone gave the following results: 199, 213, 226 mg. The total of these values for the former was 904 mg. and for the latter 638 mg., so that the zirconium hydrate effected a 42% increase in polishing effectiveness.

Example 2

A composition was prepared composed of 42.5 g. of Lustrox brand zirconium oxide and 7.5 g. of zirconium acetate dry. This material gave the following glass polishing test results: 294, 332, 313 mg. weight loss. Using these values as a base, this represents a 47% increase in polishing effectiveness, as compared to the Lustrox alone, using the values given in Example 1.

Example 3

A composition was made up composed of 42.5 g. of cerium oxide and 7.5 g. of zirconium acetate dry. The material gave the following results in the glass polishing test: 306, 332, 340 mg. weight loss. Cerium oxide alone by the same test gave the following results: 163, 215, 272 mg. weight loss. The zirconium acetate thus improved the polishing effectiveness of the cerium oxide by 50%, the comparison being based on the totals of the first three values.

Example 4

A composition was prepared composed of 42.5 g. commercial monoclinic zirconium oxide, and 7.5 g. of zirconium acetate dry. The composition was used to polish glass in accordance with the test described above. The results were as follows: 241, 290, 353 mg. weight loss. 50 g. of the same oxide alone gave the following results in a second test: 177, 210, 232 mg. weight loss. The sum of the latter values was 619 and the sum of the former 884. Thus, the zirconium acetate improved the polishing effectiveness of the zirconium oxide by 42%.

Example 5

Example 4 was repeated, using carbonated hydrous zirconia in place of zirconium acetate. Equivalent results were obtained.

Example 6

A composition was prepared composed of 42.5 g. commercial silica or white rouge and 7.5 g. zirconium acetate dry. When used to polish glass, the following results were obtained: 199, 268, 154 mg. weight loss. 42.5 g. of silica alone gave the following results: 111, 187, 187 mg. The difference amounted to a total of 136 or a 26% increase.

Example 7

A composition was prepared composed of 47.5 g. finely divided zirconium silicate and 2.5 g. zirconium acetate dry. When used to polish glass, the following results were obtained: 180, 218, 206 mg. weight loss. 50 g. alone of zirconium silicate gave the following results: 131, 155, 166 mg. The difference amounted to a total of 152 or a 33% increase.

We claim:

1. A glass polishing composition consisting essentially of at least one polishing compound selected from the group consisting of zirconium oxide, cerium oxide, silicon dioxide and zirconium silicate, and an additive in an amount to increase the polishing effectiveness of the polishing compound, consisting essentially of at least one chemically active zirconium compound selected from the group consisting of zirconium hydroxide and zirconium carbonate.

2. A glass polishing composition in accordance with claim 1 in which the polishing compound is zirconium oxide.

3. A glass polishing composition in accordance with claim 1 in which the polishing compound is cerium oxide.

4. A glass polishing composition in accordance with claim 1 in which the polishing compound is silicon dioxide.

5. A glass polishing composition in accordance with claim 1 in which the polishing compound is zirconium silicate.

6. A glass polishing composition in accordance with claim 1 in which the additive is zirconium hydroxide.

7. A glass polishing composition in accordance with claim 1 in which the additive is zirconium carbonate.

8. A glass polishing composition in accordance with claim 1 in which the additive is present in an amount within the range from 0.25 to 60% by weight of the polishing compound.

9. A glass polishing composition in accordance with claim 1 in which the polishing compound is zirconium oxide and the additive is zirconium hydroxide.

10. A glass polishing composition in accordance with claim 1 in which the polishing compound is zirconium silicate and the additive is zirconium hydroxide.

11. A glass polishing composition in accordance with claim 1 in which the additive comprises a compound forming the said additive in situ.

12. A glass polishing composition in accordance with claim 11 in which the additive is zirconium acetate.

13. A glass polishing composition in accordance with claim 11 in which the additive is zirconium sulfate.

14. A glass polishing composition consisting essentially of water, at least one polishing compound selected from the group consisting of zirconium oxide, cerium oxide, silicon dioxide and zirconium silicate, and an additive in an amount to increase the polishing effectiveness of the polishing compound, consisting essentially of at least one chemically active zirconium compound selected from the group consisting of zirconium hydroxide and zirconium carbonate.

15. A glass polishing composition in accordance with claim 14 in which the additive is present in an amount within the range from 0.25 to 60% by weight of the polishing compound.

16. A process of polishing glass which comprises applying to the surface of the glass a composition consisting essentially of water, at least one polishing compound selected from the group consisting of zirconium oxide, cerium oxide, silicon dioxide and zirconium silicate, and an additive in an amount to increase the polishing effectiveness of the polishing compound, consisting essentially of at least one chemically active zirconium compound selected from the group consisting of zirconium hydroxide and zirconium carbonate.

17. A process in accordance with claim 16 in which the glass polishing composition is reused for successive glass articles to develop the maximum polishing efficiency.

References Cited in the file of this patent

UNITED STATES PATENTS

| | | |
|---|---|---|
| 2,273,871 | Kinzie | Feb. 24, 1942 |
| 2,304,754 | Wainer | Dec. 8, 1942 |
| 2,383,500 | Polan | Aug. 28, 1945 |
| 2,554,070 | Stead | May 22, 1951 |
| 2,694,004 | Coffeen | Nov. 9, 1954 |
| 2,744,001 | Harman et al. | May 1, 1956 |
| 2,816,824 | Wilansky | Dec. 17, 1957 |

UNITED STATES PATENT OFFICE
CERTIFICATE OF CORRECTION

Patent No. 3,123,452                           March 3, 1964

William M. Harris et al.

It is hereby certified that error appears in the above numbered patent requiring correction and that the said Letters Patent should read as corrected below.

Column 1, line 47, for "these metals" read -- zirconium --; column 2, line 58, for "weighted" read -- weighed --.

Signed and sealed this 30th day of June 1964.

(SEAL)
Attest:

ERNEST W. SWIDER
Attesting Officer

EDWARD J. BRENNER
Commissioner of Patents